April 20, 1948.    C. D. PETERSON ET AL    2,440,155
FLUID SEAL
Filed Nov. 30, 1944    2 Sheets-Sheet 1

INVENTORS
CARL D. PETERSON
BY ALBERT H. DEIMEL
Bodell & Thompson
ATTORNEYS

April 20, 1948. C. D. PETERSON ET AL 2,440,155
FLUID SEAL
Filed Nov. 30, 1944 2 Sheets-Sheet 2
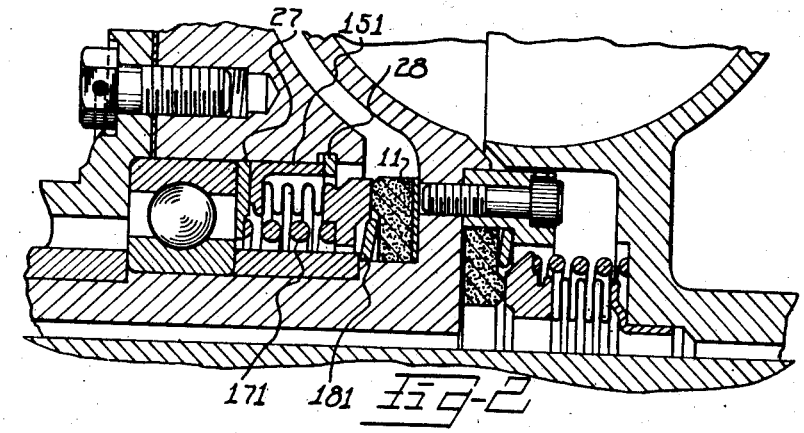
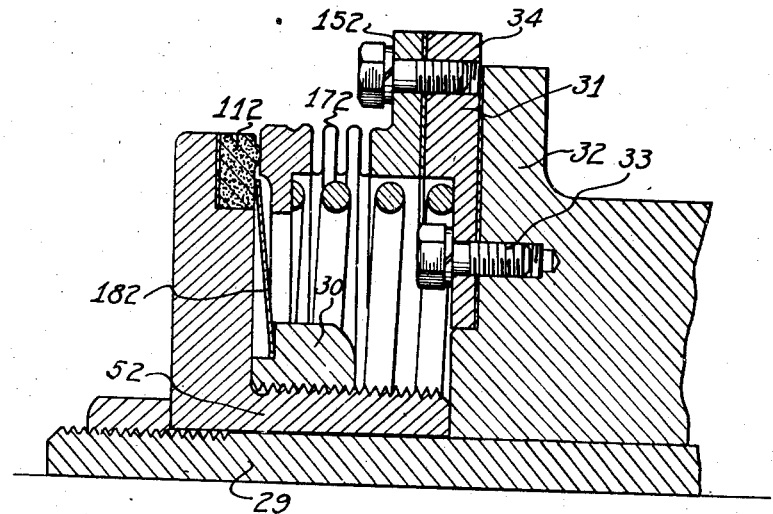
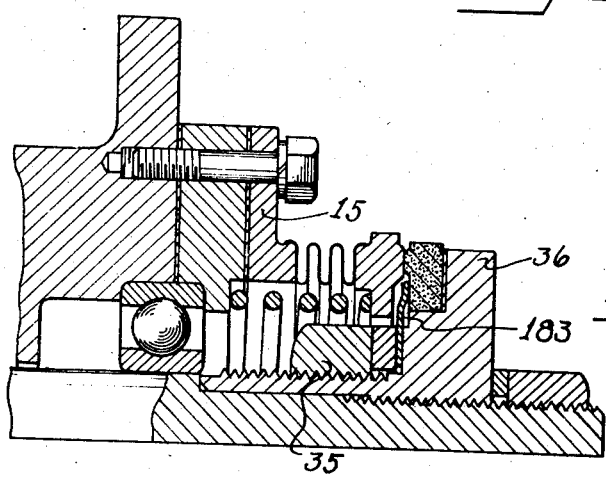
INVENTORS
CARL D. PETERSON
BY ALBERT H. DEIMEL
Bodell & Thompson
ATTORNEYS Patented Apr. 20, 1948

2,440,155

UNITED STATES PATENT OFFICE 2,440,155

FLUID SEAL

Carl D. Peterson and Albert H. Deimel, Toledo, Ohio; said Deimel and Marion F. Peterson, executrix of said Carl D. Peterson, deceased, assignors to Dana Corporation, Toledo, Ohio, a corporation of Virginia Application November 30, 1944, Serial No. 565,830

2 Claims. (Cl. 286—11)

This invention relates to fluid seals, particularly for hydraulic transmission units of the hydro-kinetic type, wherein it is essential to confine the leakage of the fluid to an infinitesimal minimum, and has for its object a simple, easily-installed and long-lived seal, which is not warped or distorted by any temperature that can develop in the unit and is easily installed by the average mechanic, requires no lapping or other highly skilled work in installation and has but one pair of radial edge sealing surfaces.

The invention consists in the novel features and in the combinations and constructions hereinafter set forth and claimed.

In describing this invention, reference is had to the accompanying drawings, in which like characters designate corresponding parts in all the views.

Figures 2, 3 and 4 are fragmentary views illustrating slightly modified forms of the seals.

Figure 1:
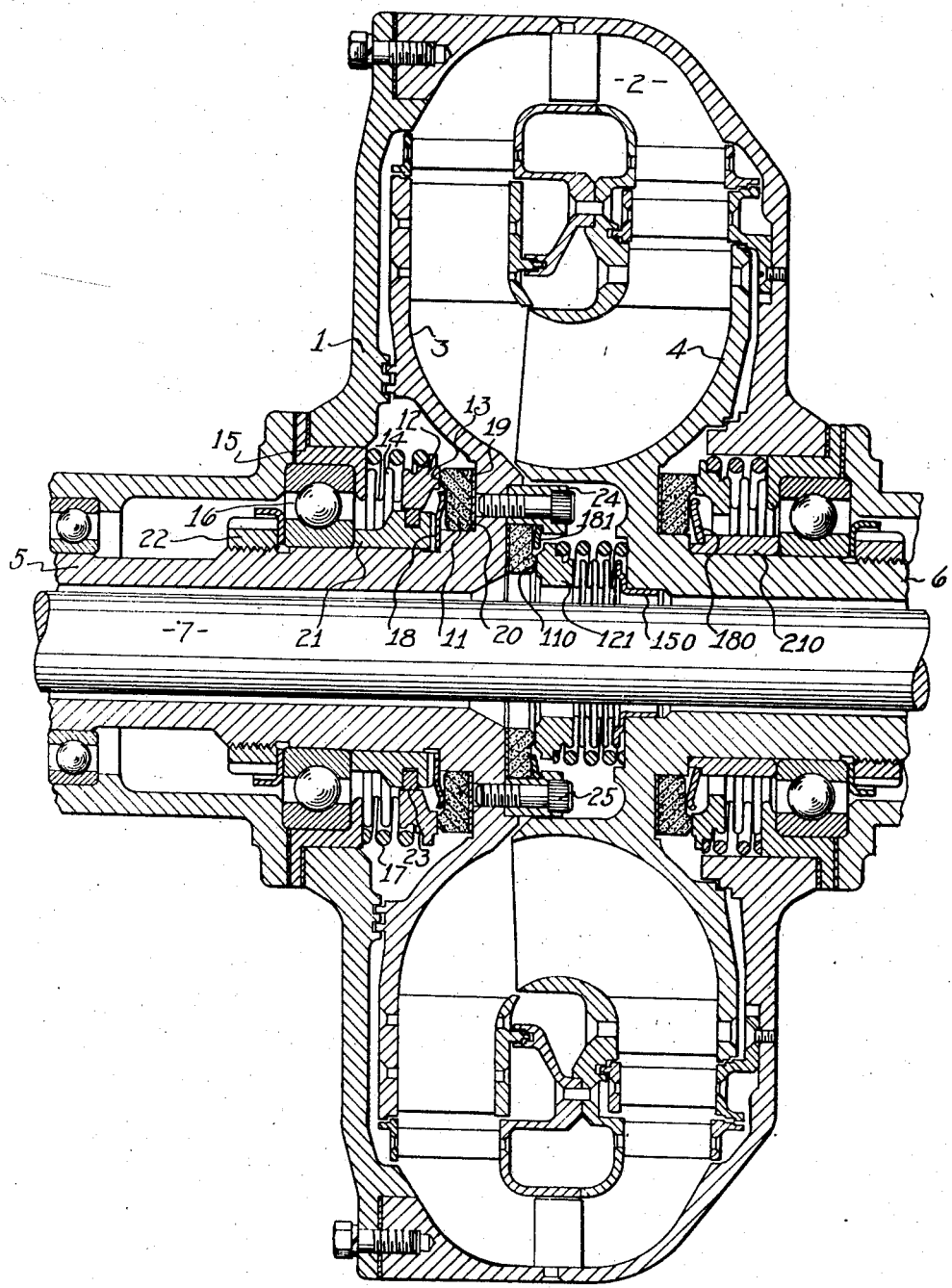
Figure 1 is a radial sectional view of a hydraulic transmission, as a torque converter involving fluid seals embodying this invention.

This fluid seal includes, generally, a ring of a material, such as carbon, having a small coefficient of expansion relative to that of metal, fixedly mounted on one of two relatively rotating parts of the transmission unit, a second ring of metal fixed to the other of said two parts, the rings having radial annular engaging or sealing faces, a bellows secured to the metal ring and located between the metal ring and the part of the transmission with which the metal ring is associated, to prevent the flow of fluid from outside of the rings and bellows to the inside, or vice-versa, in accordance with the direction of the pressure of the fluid, and spring means for clamping the first or carbon sealing ring to the part with which it is associated, and thereby fixing it thereto, this clamping means only frictionally engaging the carbon ring and not being interlocked therewith and also applying enough pressure to hold the carbon ring from rotation relative to the part with which it is associated, without the use of keys, bolts, or screws or other mechanical means or structures.

The fluid seals are here shown as embodied in a hydraulic torque converter in which 1 designates the stationary housing, 2 the stator carried by the housing, 3 the impeller and 4 the runner. The impeller is here shown as having an elongated hub 5 which may be connected in any suitable manner to a prime mover or engine. The runner is also shown as provided with a hub 6 connected to a part to be driven. The hubs 5 and 6, as here shown, surround a shaft 7. The shaft 7 may be actuated by the prime mover and connected to the same driven part as the hub 6 through a clutch operating to directly connect the shaft 7 to the driven part, when cutting out the drive through the converter. The prime mover and the driven mechanism and the manner in which it is actuated from the runner 4 and the shaft 7 form no part of this invention.

In Figure 1, three seals are shown to confine the fluid to within the housing 1 and between the impeller and the runner. These seals are of practically the same construction and the seal at the left side of Figure 1 will be described in detail.

11 designates the carbon ring which is fixedly mounted on and rotatable with the impeller 3. 12 designates the metal ring fixed to the casing 1, and 13 designates the radial edge sealing between these two rings. 14 are bellows fixed at one end to the metal seal and at its other end to an abutment or cup 15 interposed between the housing 1 and the outer race of a journal bearing 16 between the housing 1 and the hub 5 of the impeller, the bellows being secured as by soldering to both the metal ring 12 and the cup 15. 17 is a coiled spring thrusting in opposite directions against the cup 15 and the metal ring 12. This spring may be located either inside or outside of the bellows. The ring 12, bellows 14, abutment 15 and spring 17 constitute a unitary structural member.

The carbon ring 11 is perfectly annular, without any flat portions on its inner bore or outer circumference for the purpose of keying it to the hub 5 or the impeller 3, and its front and rear surfaces are flat and radial with the exception that the front side, that is, the side toward the ring 12 is provided with an annular nose on which the sealing surface is provided. In other words, the ring 11 is substantially rectangular in cross section throughout its entire circle or annularly symmetrical and also symmetrical in cross section. This construction avoids distortion or warping under the heat generated in the hydraulic unit. The carbon ring 11 is fixedly mounted on the part with which it rotates, that is, the impeller 3, by clamping means which causes it to be frictionally engaged only with the impeller 3 and with the clamping means, thus eliminating the use of keys, lugs, bolts, screws, etc. The clamping means is a spring washer 18, that here shown being of the dished or Belleville type, this being anchored at one edge as at its inner edge to the hub 5 and its outer rim pressing against the carbon ring and thrusting it toward a flat radial annular surface 19 on the impeller 3, the pressure being sufficient to hold the carbon ring from rotation relative to the impeller 3. Preferably, a thin flat gasket 20 is located between the carbon ring and the surface 19, this being extremely thin and relatively soft and capable of withstanding maximum heat generated in the transmission unit. It may be of a material containing asbestos or soft lead or copper.

In the form shown at the left side of Figure 1, the washer 18 is anchored between an abutment ring, as a spacer 21 surrounding the hub 5 within the bellows 14, the spacer abutting against the inner race of the bearing 16 and the inner race being held in position by a nut 22 threading on the hub 5. In order to prevent any leakage at all even an infinitesimal amount, a pistonlike packing ring 23 may be interposed between the spacer 21 and the inner cylindrical surface of the metal ring 12, but this piston ring is usually omitted. At the right side of Figure 1, substantially the same construction is shown with the exception that an ordinary spring washer 180 is used instead of the Belleville washer, and this spring washer is held at its inner edge in a notch in a spacer 210, corresponding to the spacer 21. At the middle of Figure 1, a seal is shown for preventing the flow of oil from between the runner and impeller to the shaft 7, and hence the carbon ring 110 is an internal one instead of an external one. 181 designates the spring washer, this being seated at its outer edge in a notch in a ring 24 surrounding the carbon ring 110 and secured to the part with which the carbon ring rotates, that is, in this instance, the impeller 3, by screws 25. Also, in the seal shown in the middle of Figure 1, the bellows thrust at its end remote from the metal ring 121 against an annular flange on an abutment or cup 150 telescoping into the bore of the hub of the runner.

In the form shown in Figure 2, the spring 171 is shown as located inside the bellows and the cup or abutment 151, corresponding to the abutment 15 (Figure 1), thrusts at its bottom against a ring 27 which in turn thrusts against the outer race of the bearing, corresponding to the bearing 16 (Figure 1). The spacer sleeve 21 thrusts against the inner race of this bearing, as in Figure 1. The cup 151 fits into a bore in the contiguous part of the housing 1 and is held from displacement by a snap ring 28. The spring washer 181, although not of the Belleville type, is located substantially the same as the Belleville washer 18 (Figure 1) between the end of the spacer and the carbon ring 11.

In the form shown at the right hand end of Figure 2, the washer is substantially the same as that shown in the middle of Figure 1.

In Figure 3, the carbon ring 112, corresponding to the ring 11 (Figure 1), is clamped in an annular recess in a flange on a sleeve 52 around the shaft 29 and the spring washer 182, corresponding to the Belleville washer 18 (Figure 1), thrusts at its inner edge against a nut 30 threading on the sleeve 52. The sleeve 52 extends into the bellows and the nut 30 is located in the bellows. Also, the spring 172, corresponding to the spring 17 (Figure 1), is located in the bellows. The bellows thrusts at its end remote from the sealing surfaces against an abutment or cup 152 surrounding the spring and abutting flatwise against a mounting ring 31 secured to one of the two relative rotating parts 32, as by screws 33. The cup 152 is secured to the retaining ring 31 by screws 34. In Figure 3, the application of this seal to two relatively rotating parts is shown in which the carbon ring is held from relative rotation with the part on which it is mounted, by means of a spring washer in a manner slightly different than shown in Figure 1.

In Figure 4, the spring washer 183 is shown as held at its inner edge by a spacer which is held in position by a nut 35 threading on a hub on the rotating part 36 on which the carbon sealing ring is mounted. The rest of the assembly in this view is analogous to that shown in Figure 3.

In any form of the invention, the sealing ring is annularly symmetrical and also symmetrical in cross section, so as not to distort under the heat developed, and is clamped in position against rotation relative to the member or part on which it is mounted, without the use of lugs, screws, keys, etc.

In any form of the invention, the carbon sealing ring is clamped against rotation on the part with which it is associated by a spring washer and an abutment ring fixed from axial movement relative to the part on which the carbon ring is mounted; the metal sealing ring is part of a unitary structure including the cup or abutment 15, 150, 151, 152 or 153, the bellows secured at its ends to the abutment and the metal sealing ring, the coiled spring between the abutment and the sealing ring, whether inside or outside of the bellows, and the spacer or ring 21 against which the spring washer abuts, whether a sleeve or a spacer held in position by a nut, or by a nut alone or by an external ring, as at the middle of Figure 1, is free of the unitary structure. Owing to these features, the entire seal is easily installed.

What we claim is:

1. A fluid seal for hydraulic transmission units including relatively rotating coaxial parts, the seal including a ring of a material having a small coefficient of expansion relative to that of metal fixed on one of said parts, a second ring of metal fixed to the other of said parts, the rings having coacting radial, annular sealing faces, a bellows secured to the metal ring and arranged to prevent the flow of fluid from the outside of the rings and bellows to the inside, and vice-versa, around the sealing faces, and a spring washer carried by the part with which the first ring is associated and loaded to press against and frictionally engage the first ring to clamp the first ring to the part with which it is associated and thereby fix it thereto, the spring washer being located between said rings within the circles of their annular sealing faces.

2. A fluid seal for hydraulic transmission units including rotating coaxial parts, the seal including a sealing ring for mounting on one of said parts and a unitary structure including a second sealing ring, an abutment for attachment to the other of said parts and spaced from the second sealing ring, a bellows between the abutment and the second sealing ring and secured thereto, a spring interposed between the abutment and the second sealing ring, a ring member within the bellows concentric therewith, and means for holding it therein, and a spring washer for clamping the first sealing ring to the part with which it is associated, the spring washer being interposed between the said ring member and the first sealing ring, the ring member serving as an abutment within the bellows against which the spring washer fulcrums.

CARL D. PETERSON.
   ALBERT H. DEIMEL.

REFERENCES CITED

The following references are of record in the file of this patent:

UNITED STATES PATENTS

| Number | Name | Date |
|---|---|---|
| 1,880,846 | Dake | Oct. 4, 1932 |
| 2,080,403 | Homan | May 18, 1937 |
| 2,151,730 | Basebe et al. | Mar. 28, 1939 |
| 2,264,002 | Neracher et al. | Nov. 25, 1941 |

FOREIGN PATENTS

| Number | Country | Date |
|---|---|---|
| 517,868 | France | 1920 |